United States Patent [19]

Kindig

[11] Patent Number: 5,153,838
[45] Date of Patent: Oct. 6, 1992

[54] PROCESS FOR BENEFICIATING PARTICULATE SOLIDS

[75] Inventor: James K. Kindig, Boulder, Colo.

[73] Assignee: Genesis Research Corporation, Carefree, Ariz.

[21] Appl. No.: 740,956

[22] Filed: Aug. 6, 1991

Related U.S. Application Data

[62] Division of Ser. No. 492,312, Mar. 6, 1990, Pat. No. 5,096,066, which is a division of Ser. No. 126,419, Nov. 30, 1987, abandoned.

[51] Int. Cl.$^5$ .............................. B03B 5/32; B04L 5/00
[52] U.S. Cl. .................................. 364/468; 209/172.5; 209/211
[58] Field of Search ............... 364/468; 75/10.37, 749, 75/10.67, 10.59, 601, 678; 420/88; 423/322; 209/127.3, 128, 172.5, 211; 210/788

[56] References Cited

U.S. PATENT DOCUMENTS

| | | |
|---|---|---|
| 2,701,641 | 2/1955 | Krijgsman . |
| 2,819,795 | 1/1958 | Fontein et al. . |
| 3,463,310 | 8/1969 | Ergun et al. . |
| 3,794,162 | 2/1974 | Miller et al. . |
| 4,140,628 | 2/1979 | Horsfall . |
| 4,219,409 | 8/1980 | Liller . |
| 4,341,352 | 7/1982 | Liller . |
| 4,364,822 | 12/1982 | Rich . |
| 4,432,868 | 2/1984 | Aldrich . |
| 4,451,358 | 5/1984 | Chupka . |
| 4,622,132 | 11/1986 | Chupka . |
| 5,096,066 | 3/1992 | Kindig .............................. 209/172.5 |

OTHER PUBLICATIONS

Fourie, et al., *The Beneficiation of Fine Coal be Dense-Medium Cyclone*, Journal of South African Institute of Mining and Metallurgy, pp. 357-361 (Oct. 1980).

Gaudin, *Principals of Mineral Dressing*, McGraw-Hill Book Company, Inc., pp. 192-194 (1939).

Deurbrouck, *Washing Fine-Size Coal in a Dense-Medium Cyclone*, Bureau of Mines Report of Investigations 7982.

Deurbrouck, et al., *Performance Characteristics of Coal-- Washing Equipment: Dense-Medium Cyclones*, Bureau of Mines Report of Investigations 7673.

Bradley, *The Hydrocyclone*, Pergamon Press Ltd., pp. 19-40, 48-62, and 107-131 (1965).

Gochin, et al., *Dense Medium Separation*, Mining Magazine, pp. 453-467 (Dec. 1983).

Mengelers, et al., *HM Cyclones, If Run on Brine Medium, Offer Sharper Separation of Coal Fines*, Coal Mining and Processing, pp. 78-80 (Sep. 1982).

Geer, et al., *Preliminary American Tests of a Cyclone Coal Washer Developed in the Netherlands*, Transactions of the American Institute of Mining and Metallurgical Engineers, Coal Division, vol. 177, pp. 220-239 (1948).

Arterburn, *The Sizing of Hydrocyclones*, Krebs Engineers (1976).

Lotzien, et al., *Cleaning of Ultra-Fines in Heavy Liquid Cyclones*, Aufbereitungs-Technik, vol. 28, No. 10, pp. 563-570 (W. Germany, Oct. 1987).

Durham, et al., *Power Plant Flyash Magnetite Performs Well in Coal Cleaning*, Power Engineering, pp. 52-55 (Apr. 1986).

Sokaski, et al., *Cleaning Unsized Fine Coal in a Dense-Medium Cyclone Pilot Plant*, Bureau of Mines Report of Investigations 6274.

Chakravarti, et al., *A Study of the Operation of 6 in. Diameter Cyclone Washer*, Journal of The Institute of Fuel, pp. 612-622, (Great Britain, Nov. 1957).

Stoessner, et al., *Optimization of Dense Media Cyclone Performance For Low Gravity, Fine Coal Cleaning*, (1986).

*Primary Examiner*—Jerry Smith
*Assistant Examiner*—Jim Trammell
*Attorney, Agent, or Firm*—Sheridan Ross & McIntosh

[57] ABSTRACT

A method for determining the efficiency of separation of a dense media separation process is disclosed including determining an apparent distance a particle must travel to be correctly beneficiated and calculation of an apparent velocity for correct beneficiation. Apparent velocity, cyclone geometry, and operating parameters are used to calculate a divergence value which indicates the efficiency of separation. Cyclone geometry and operating parameters may be selected for use in a dense media separation process by adjusting geometry and operating parameters in a manner to obtain desired efficiency.

7 Claims, 4 Drawing Sheets

PROCESS FOR BENEFICIATING PARTICULATE SOLIDS

This is a division of application Ser. No. 07/492,312, filed Mar. 6, 1990. U.S. Pat. No. 5,096,066, which is a division of application Ser. No. 07/126,419, filed Nov. 30, 1987 and now abandoned.

FIELD OF THE INVENTION

The present invention relates to an improved process for beneficiating coal fines and for predicting the efficiency of separation of density separation processes.

BACKGROUND OF THE INVENTION

The burning of fossil fuels, including coal, is necessary to meet the energy requirements of our society. However, the combustion of coal, and in particular, many lower grades of coal, produces sulfur oxides which are emitted to the atmosphere. The release of these compounds produces many detrimental environmental effects. Respiration of these pollutants can cause human health problems ranging from mild respiratory irritation to more serious chronic diseases. Sulfur oxides can also react with other compositions in the atmosphere to form acid precipitation which has the effect of acidifying bodies of water and destroying the wildlife which live in such habitats. Acid precipitation also can destroy manmade structures such as buildings and statues.

Industry has sought to burn coal with low sulfur content to avoid the problems associated with sulfur oxides emissions. However, such fuel is not always readily available and the costs to recover and transport such high quality coal is in many cases prohibitive. Therefore, to meet the objective of environmentally acceptable coal combustion, effective methods are needed to remove sulfur compounds from the coal before, during, and after combustion.

Recent revisions in the Federal Clean Air Act require a ninety percent reduction in pounds of sulfur dioxide per million Btu for high sulfur coal before release to the atmosphere of combustion byproducts for new sources of air pollution. Some states have applied stringent requirements for reduction of sulfur dioxide to existing facilities. Federal and state legislation, therefore, make it necessary to achieve high reductions in the amount of sulfur compounds emitted during the combustion of coal.

A method of reducing the sulfur content of coal before combustion includes: (1) grinding the coal to a small particle size to liberate the inorganic sulfur containing compounds and other ash forming minerals from coal; and (2) separating the inorganic material bearing sulfur from the organic portion, coal. A major limitation in this technique is that when coal is ground fine enough to liberate substantial quantities of sulfur minerals and ash-forming minerals, separation of the coal from the unwanted material and subsequent recovery of the coal become difficult.

The grind size required to enable a ninety percent pyrite reduction and eighty-five percent Btu recovery for most coals is less than 0.5 mm and frequently finer than 0.1 mm. At these sizes, reported beneficiation techniques are not consistently effective in separating coal at acceptable efficiencies.

Jigs, hydrocyclones and tables are inefficient for separation of minus 0.5 mm coal. Froth flotation is ineffective when applied to oxidized coals because their surface character is not sufficiently hydrophobic to be activated by collecting reagents. For unoxidized coals, good Btu recovery is attainable by froth flotation, but pyrite rejection is difficult because of the relative ease with which pyrite floats.

Ergun, U.S. Pat. No. 3,463,310 discloses a method of cleaning fine coal material (0.400 mm–0.037 mm) by subjecting a mixture of coal and pyrite to electro-magnetic radiation which selectively magnetizes pyrite. Pyrite is then removed by magnetic means. This process is limited to magnetizable refuse material such as pyrite. Other materials frequently found in coal, such as silica, cannot be removed by this method.

Dense media cyclones are efficient devices for separating coal in the quarter inch to 0.5 mm range from refuse material on the basis of coal and refuse material having different densities. A mixture of the two materials is suspended in a dense media to form a sink product and a float product. A dense media, or a psuedo-heavy liquid, is necessary because the specific gravities of coal and refuse material are greater than one, and therefore, cannot be separated by water alone. A media with an effective media specific gravity between that of coal and of refuse material is required. A common media useful for coal beneficiation is a suspension of magnetite particles in water. By introducing a coal-refuse material mixture into a magnetite media, clean coal floats and refuse material sinks. Separation of these materials is hastened by using a dense media cyclone which increases the nominal gravitational acceleration on the mixture.

The use of dense media cyclone separations for beneficiating coal is well known. For example, Miller, et al., U.S. Pat. No. 3,794,162, is directed toward a heavy medium beneficiating process for coal particles greater than 150 mesh (about 0.1 mm). Horsfall, U.S. Pat. No. 4,140,628, is also directed toward a dense medium separation process. Horsfall discloses the use of magnetite particles less than 0.100 mm for beneficiation of coal fines having a particle size less than 1.000 mm and, in particular, less than 0.500 mm. This process involves separation of materials in a suspension with a dense media to form two fractions and a series of subsequent screenings and washings of magnetite from the two fractions. Horsfall, however, does not address the question of efficiency of separation of the two products.

Previous attempts to extend the performance of dense media cyclones below 0.5 mm have generally met with limited success and, in particular, have been unsuccessful in terms of teaching a general method for efficient separation. One parameter which is useful in assessing the effectiveness of separation of coal fines and refuse material by dense media and other separation techniques is the Ecart Probable (Ep). The Ep value is defined as the difference between the particle density of that fraction of the cyclone feed having a 75% chance of reporting to the overflow minus the particle density of that fraction of the cyclone feed having a chance of reporting to the overflow divided by two. The separation gravity is defined as the specific gravity of a small increment of the feed which reports fifty percent to the clean coal overflow and fifty percent to the refuse underflow. The Ep value is a measure of the sharpness or efficiency of the separation, while the separation gravity defines the specific gravity at which the separation occurred. This separation gravity is different for different size fractions of feed coal even though all size fractions are cleaned in the same dense media cyclone. Generally, a smaller size fraction has a higher separation gravity. Also, the specific gravity of the dense media is generally less than the separation gravity.

A typical dense media is a suspension of magnetite particles in water. The magnetite can be natural magnetite which has been milled. Magnetite is also recoverable from fly ash. For example, Aldrich, U.S. Pat. No. 4,432,868 discloses that magnetite particles less than 325 mesh in diameter, having 90% magnetics, and a specific gravity between 4.1 and 4.5, can be obtained from fly ash. Aldrich further discloses that such magnetite contains a high proportion of round particles which are desirable for heavy medium separation because round particles reduce the viscosity of the heavy medium and facilitate separation.

Fourie, et al., *The Beneficiation of Fine Coal by Dense-Medium Cyclone*, J. S. African Inst. Mining and Metallurgy, pp. 357-61 (October 1980), discloses dense media cyclone separation of a 0.5 mm-0.075 mm coal fraction in a heavy medium cyclone with milled magnetite with at least fifty percent less than 0.010 mm using a 150 mm diameter cyclone. Ep values from 0.020 to 0.031 were achieved. While acceptable separation efficiencies were achieved by Fourie, et al., the reference does not address cleaning the minus 0.075 mm coal fraction or provide a general method for determining operational parameters necessary to achieve acceptable efficiencies.

Extending the capability of density separation beyond reported limits to effectively separate coal fines smaller than 0.5 mm and particularly smaller than 0.075 mm is highly advantageous. Substantial reductions in sulfur content and high Btu recovery can be achieved with such coal sizes. The ability to clean such fine coal is also economical because waste coal fines which were previously unrecoverable can now be used as an additional fuel source. Accordingly, there is a need for an improved process for the beneficiation of minerals to effectively recover fine coal.

SUMMARY OF THE INVENTION

One aspect of the present invention involves a method for selecting magnetite to form a dense media for a dense media separation to beneficiate particulate solids. Particulate solids are provided having a predetermined minimum particle size and a known specific gravity. The method involves calculating a diameter ratio value applicable to the particulate solids, magnetite and the dense media. A diameter ratio value represents a particulate solid to magnetite particle diameter ratio for particles having equal but oppositely directed settling velocities in dense media of a given specific gravity. The method further involves selecting magnetite having a particle diameter such that the actual particulate solid to magnetite diameter ratio is greater than the diameter ratio value. This method is particularly useful for beneficiating coal having a particle size less than about 0.15 mm.

The present method is also directed toward using magnetite having a particle diameter of less than about 0.005 mm and a mean particle diameter of about 0.0025 mm. Such fine sized magnetite is particularly useful for beneficiating fine coal particles at low media specific gravities. Magnetite of this size can be produced by a process which involves providing an aqueous iron (ferrous) chloride solution. A gas phase pyrohydrolysis reaction is then conducted on the solution to form a mixture of magnetite and hematite. By conducting the reaction in an oxygen restricted atmosphere, substantially only magnetite is produced. If the pyrohydrolysis reaction is conducted in an atmosphere with unrestricted oxygen, a substantial portion of the product is hematite. For such mixtures, the method further includes chemically reducing sufficient hematite in the mixture to obtain a mixture comprising at least about 85 percent magnetite.

Another aspect of the present invention involves determining the efficiency of separation of a dense media separation process for beneficiating particulate solids. This method uses, as an indication of efficiency, a "divergence value". This term indicates the difference between the specific gravity of the particle to be separated and the effective media specific gravity. This method involves determining an apparent distance a particle must travel within a dense media cyclone or centrifuge to be correctly beneficiated. From the apparent distance and the residence time of particles in the cyclone or centrifuge, an apparent velocity a particle must achieve to be correctly beneficiated is calculated. Using the apparent velocity and other known cyclone geometry and operational parameters, a divergence value is calculated to indicate the efficiency of separation of the system.

A further aspect of the invention involves a method for selecting cyclone geometry and operating parameters for improved efficiency of separation in a dense media cyclone separation process. This method involves determining a proposed separation efficiency in terms of a proposed divergence value. A set of cyclone geometry and operating parameters are selected. A divergence value for the selected cyclone geometry and operating parameters is determined and compared with the proposed divergence value. If the selected divergence value is greater than the proposed divergence value, a new set of cyclone geometry and operational parameters are selected and a new divergence value determined. This process is iterated until the selected divergence value is less than the proposed divergence value. The step of selecting new cyclone geometry and operating parameters includes selecting greater cyclone length, smaller inlet diameter and greater inlet velocity at constant flow rate, decreased dense media viscosity, larger particle size and lower specific gravity.

A still further aspect of the invention involves a method for beneficiating particulate solids. This method involves providing magnetite having a diameter such that the particulate solids have a buoyancy with respect to the dense media. Cyclone geometry and operating parameters are then selected and a divergence value for the geometry and parameters is determined. The particulate solids are then beneficiated in a cyclone having the cyclone geometry and operating parameters with dense media formed from the provided magnetite.

DETAILED DESCRIPTION OF THE INVENTION

The present invention is directed toward an improved method for beneficiating particulate solids from refuse material in a dense media cyclone. By practice of the invention, particulate solids, and in particular, coal, can be effectively cleaned down to a particle size on the order of tens of microns. When cleaning coal at such fine particle sizes, more than 60 percent of the pyrite and more than 60 percent of the ash can be removed, while retaining more than 60 percent of the heating value.

In one aspect of the present method, extremely fine magnetite is used to form a dense media for beneficiating coal in a dense media cyclone. Magnetite is selected having a particle size such that the buoyant force of the coal with respect to the dense media is great enough to provide effective separation. It has been recognized that effective separation of small coal particles requires the use of magnetite fine enough so that the coal particle to magnetite diameter ratio is greater than a diameter ratio value. Magnetite having about a 2.5 micron mean diameter is generally effective for cleaning coal fractions down to 0.015 mm.

In another aspect of the invention, a method for predicting the efficiency of separation in a dense media cyclone is provided. This method involves the use of three equations which have been derived that relate divergence values (difference between specific gravity of a particle and effective media specific gravity) to a number of terms including cyclone geometry factors and operating parameters. Divergence values have been recognized to be a measure of the efficiency of separation of a system. One of the terms in each of the equations is V, apparent velocity that a particle must travel to be correctly beneficiated. To solve the three divergence equations, a value for V must be obtained.

V, however, cannot be directly measured. To determine V for a given system, the following procedure is used. Using the divergence equations, the term V is calculated from known data, such as that published by Deurbrouck, at an arbitrarily selected cyclone radius for sets of data corresponding to different size cyclones. These velocity terms represent actual radial particle velocities at the selected radius. However, for the purpose of simplification of analysis, radial particle velocity is assumed to be constant and is assumed to be represented by the actual velocities at the selected radius. These velocities are termed "apparent velocities" and can be determined at any radius as long as the same radius is used consistently throughout any analysis. These apparent velocities from Deurbrouck are used along with particle residence time to calculate an "apparent distance" a particle must travel to be correctly beneficiated. For coal, "correct beneficiation" is to the overflow, and for refuse material, "correct beneficiation" is to the underflow. The apparent distances thus calculated have been found to be linearly related to cyclone diameter. From this linear relationship, an "apparent distance" a particle must travel to be correctly beneficiated can be determined for any diameter cyclone. From the apparent distance, an apparent velocity can be determined for any given system. In conjunction with known parameters of the given system, a divergence value, representing efficiency, can be calculated and can be used in a comparative analysis of proposed or existing systems. Grinding coal to a small particle size is necessary for effective liberation and separation of coal from refuse material with a density separation method. Density separation operates by suspending an admixture of coal and refuse material in a dense media of a particular specific gravity which has an effective media specific gravity between the specific gravities of the coal and refuse material. Particles in the suspension having a specific gravity of pure coal or pure refuse are most likely to report correctly to the overflow or underflow because such particles have specific gravities which are either much greater or much less than the effective media specific gravity. Particles in the suspension having specific gravities about equal to that of the effective media specific gravity are equally likely to report to the overflow with the coal or to the underflow with the refuse. The specific gravity of particles which include coal and refuse material physically bound together is between that of coal and refuse material, and are, therefore, less likely to report to either the overflow or underflow than coal and refuse material, respectively. In either case, the mixed particle will either carry some refuse to the overflow or some coal to the underflow, thereby reducing the separation efficiency. By grinding coal to a small particle size, a high percentage of particles comprising coal and refuse material are broken apart into separate particles of only coal and only refuse material. Such separate particles are likely to report correctly to the overflow and underflow, respectively, because the specific gravity of each is sufficiently different from that of the effective media specific gravity to form either a float or sink particle with respect to the dense medium.

A primary difficulty with grinding coal to a small particle size, however, is efficient separation of coal from refuse material. As used herein, "refuse material" or "refuse" means any non-carbonaceous substance entrapped in coal deposits or inadvertently added to the coal during mining, including, but not limited to, clays, shales, pyrite, and other precursors to ash.

Coal which is sufficiently fine to obtain acceptable levels of refuse material rejection can be produced by grinding coarser coal by conventional means. The grind size required to enable at least about a ninety percent by weight pyrite reduction and at least about ninety percent Btu recovery for most coals is less than about 0.6 mm and frequently finer than about 0.1 mm. The present invention is particularly directed toward cleaning of coal ground fine enough to allow at least about sixty percent by weight pyrite rejection with at least about sixty percent Btu recovery, more preferably at least about eighty percent by weight pyrite rejection with at least about eighty percent Btu recovery, and most preferably at least about ninety percent by weight pyrite rejection with at least about ninety percent Btu recovery. Alternatively, fine coal can be obtained from other sources. For example, coal found in silt ponds of conventional coal preparation systems is generally less than about 0.5 mm. Most coal preparation plants currently operating dense media cyclone separation circuits produce a minus 0.5 mm raw coal slimes product which can be used in the present process. Additionally, coal derived from comminuting existing coal preparation plant refuse, i.e., gob or culm bank material, can be used. A substantial portion of any such coal source will consist of fine coal material having particle sizes less than about 0.150 mm.

The present invention involves the separation of particulate solids from refuse materials by a density separation method. The preferred embodiment of the invention discussed herein is the separation of fine coal particles from refuse material in a dense medium with a dense media cyclone. It is contemplated that the invention is applicable to beneficiation of particulate solids other than coal. It is also contemplated that the present method is applicable to beneficiation by other types of separating systems which employ centrifugal force including devices not normally considered to be gravity separators, such as centrifuges.

While magnetite dense media is discussed herein as a preferred embodiment, it should be recognized that the general principles discussed herein are equally applicable to other types of dense media. For example, dense media can be formed from suspensions of sand, barites and ferrosilicon. For example, with ferrosilicon, dense media can be formed having specific gravities which cannot be formed with magnetite dense media.

One aspect of dense media separation is that the light (or float) particles must be less dense than the effective media specific gravity for separation to occur. That is, the specific gravity of the float particles must be less than the effective media specific gravity The buoyant force on a particle is a function of the difference between the specific gravity of the particle and the specific gravity of the media. Relatively large coal particles displace dense media, i.e., a suspension of magnetite in water. As coal particles become smaller and approach the size of magnetite, they increasingly displace primarily water. Since coal is not buoyant in water, separation will not occur for such small particles.

The present invention provides a method for determining an acceptable magnetite diameter for forming dense media for the beneficiation of particular coal size distributions down to a minimum particle size. More particularly, the present method is useful for determining the size of magnetite required to produce a dense media in which a particular coal fraction is buoyant. This method has the following theoretical basis. To be buoyant, a coal particle must have a velocity in the direction of the center of a cyclone. Such a velocity is a result of a buoyant force, acting toward the center of the cyclone, minus a resistance force. Particle velocity is a function of the particle diameter, the difference between its specific gravity and the specific gravity of the fluid it displaces and the "g" acceleration arising from rotation of the coal and media in the cyclone. Accordingly, the velocities of coal, refuse and magnetite particles can be written as follows:

$$V_{coal} = K(SpGr_{coal} - SpGr_{fd})D_{coal}{}^m \quad [1]$$

$$V_{refuse} = K(SpGr_{refuse} - SpGr_{fd})D_{refuse}{}^m \quad [2]$$

$$V_{magnetite} = K(SpGr_{magnetite} - SpGr_{fd})D_{magnetite}{}^m \quad [3]$$

where
V = terminal velocity
K = term including components for acceleration and viscosity
$SpGr_{fd}$ = specific gravity of the fluid displaced
$SpGr_{coal}$, refuse or magnetite = specific gravity of the coal, refuse and magnetite
D = diameter of the particles m = exponent ranging from 2 under laminar flow conditions to 1 for turbulent conditions It is known that in dense media systems using centrifugal force, particles which form the dense media, e.g., magnetite, have a component of velocity in the direction of centrifugal force. For the present invention, the assumption is made that, at a minimum, the velocity of coal in the direction opposite the centrifugal force is equal to the component of velocity of magnetite particles comprising the dense media in the direction of centrifugal force. For refuse material, a similar assumption is made except that refuse material moves in the same direction as magnetite. Additionally, for refuse material having a buoyant force equal to that of coal, the refuse material encounters less resistance force than coal because it moves in the same direction as magnetite, and consequently, has a higher velocity As a limiting case, however, refuse material velocity must be at least as great as magnetite velocity The following equalities can be established based upon the above discussion:

$$V_{coal} = (-1)V_{magnetite} \quad [4]$$

$$V_{refuse} = V_{magnetite} \quad [5]$$

By substitution of Equations 1, 2, and 3 into the above equalities, the following ratios are derived:

$$\frac{D_{coal}}{D_{magnetite}} = \left[ (-1) \frac{SpGr_{magnetite} - SpGr_{water}}{SpGr_{coal} - SpGr_{fd}} \right]^{1/m} \quad [6]$$

$$\frac{D_{refuse}}{D_{magnetite}} = \left[ \frac{SpGr_{magnetite} - SpGr_{water}}{SpGr_{refuse} - SpGr_{fd}} \right]^{1/m} \quad [7]$$

These equations, with the exception of the negative factor in equation 6, are the same as the equal settling relation given by Gaudin, A. M., *Principles of Mineral Dressing*, McGraw-Hill Book Co., Inc., New York, N.Y., p. 186 (1939).

A value for m in the equations 6 and 7 depends upon the applicable flow regime: turbulent, transitional or laminar. The Reynolds number of a particle is a criterion which indicates whether the flow regime is laminar or turbulent. For Reynolds numbers greater than 500, flow is turbulent; between 500 and 2, transitional; and less than 2, laminar. Reynolds number depends directly upon a particle's diameter, its velocity, specific gravity of the fluid it displaces and inversely upon the fluid viscosity.

To calculate the Reynolds number of a particle, its terminal settling velocity must be known. Stokes law, modified with correction factors for the simultaneous movement of many particles, may be used. Gaudin, A. M., *Principles of Mineral Dressing*, McGraw-Hill Book Co., Inc., New York, N.Y., p. 188 (1939).

$$V_{part} = \quad [8]$$

$$\frac{1}{18}(1 - s^{\frac{1}{3}})(1 - s)(1 - 2.5s)\left( \frac{g(SpGr_{part} - SpGr_{fluid})D^2}{u} \right)$$

where
s = volume fraction of solids
u = viscosity of the fluid
Reynolds number is given by the following equation:

$$Re = \frac{D\ V\ SpGr_{fluid}}{u} \quad [9]$$

Equations 6 and 7 provide limiting particle diameter ratios for coal and refuse to be correctly beneficiated in magnetite heavy media. For particle diameter ratios less than that given by equations 6 and 7, beneficiation cannot occur. The ratios provided by Equations 6 and 7 are termed "diameter ratio values". For coal or refuse particles to have the same buoyancy as though they were immersed in a true liquid having the same specific gravity as the media, the coal or refuse to magnetite particle diameter ratios must be greater than diameter ratio values given by equations 6 and 7. Equations 6 and 7 can be used to construct Diameter Ratio Partition Curves which plot diameter ratio values for a range of media specific gravities.

Figure 1:
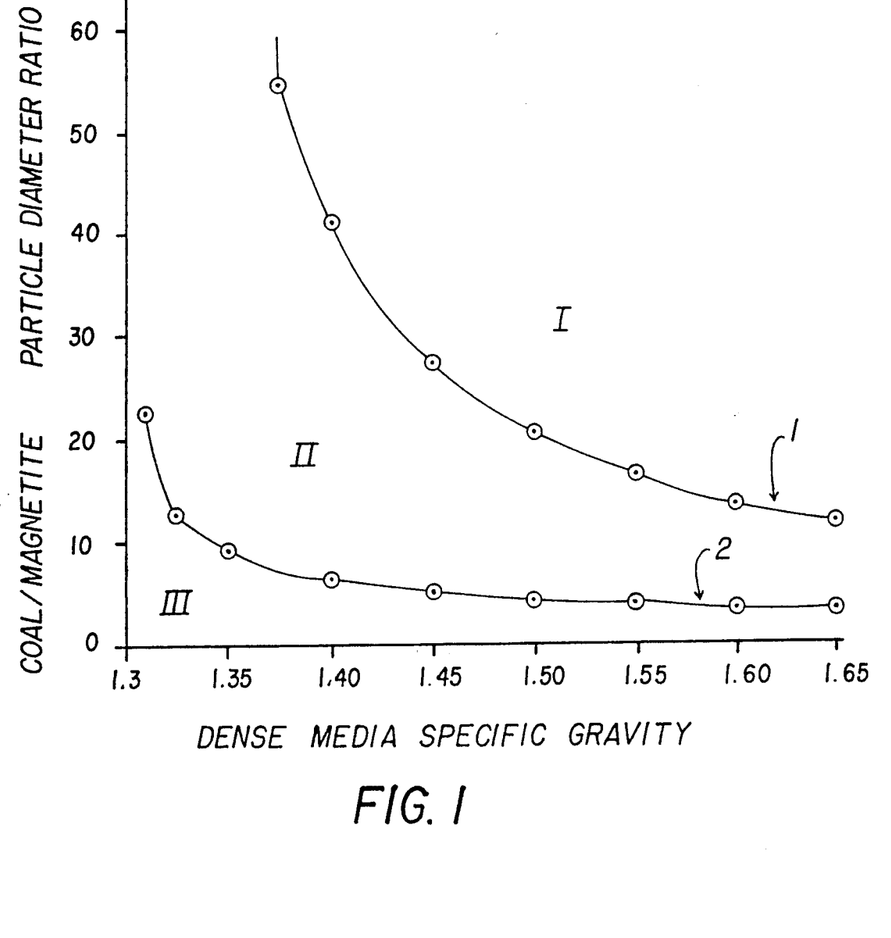
FIG. 1 is a graph of coal to magnetite diameter ratio values at differing specific gravities using a specific gravity for coal of 1.3 and a specific gravity for magnetite of 5.1.

For example, with reference to FIG. 1, a Diameter Ratio Partition Curve is illustrated wherein the specific gravity of the dense media is on the abscissa and the ratio of coal to magnetite particle diameter is on the ordinate. Diameter ratio values forming the curve indicate coal-to-magnetite particle diameter ratios for coal and magnetite particles having equal although oppositely directed velocities in a dense medium of a particular specific gravity for a given flow regime. If coal particles have a velocity in the dense medium toward the cyclone center less than magnetite particle velocity in the opposite direction, effective separation of coal by the magnetite dense medium is not possible because the coal will not "float" with respect to the dense medium.

Two curves are shown in FIG. 1. The upper curve 1 represents the theoretical minimum coal to magnetite particle diameter ratios for separation in dense media of given specific gravities for turbulent flow. The lower curve 2 represents the same information for laminar flow in the cyclone. The graph in FIG. 1 defines three important regions relevant to effective coal beneficiation: (1) the region above the turbulent curve I; (2) the region between the laminar and turbulent curves II; and (3) the region below the laminar curve III. Points on the graph in region I allow, efficient separation, while points in region III are ineffective for coal separation. Points occurring in region II produce separation efficiencies which are difficult to predict precisely, but in general depend on the flow regimes of the particles.

FIG. 1 illustrates the relationship that as the dense media specific gravity decreases, the ratio between the coal and magnetite particle diameters must increase asymptotically for effective separation. In view of this relationship, processes using dense media with low specific gravities should have high particle diameter ratios, i.e. small magnetite with respect to the coal, for the diameter ratio points to be greater than diameter ratio values.

Equal settling curves similar to those depicted in FIG. 1 can be generated by selecting appropriate values for coal specific gravity and coal size and solving for magnetite particle size diameter according to Equations 6 or 7. The turbulent curve of FIG. 1 was generated using a specific gravity for magnetite of 5.1 and for coal of 1.3 for various dense media specific gravities. For example, in a dense media having a specific gravity of 1.6, a coal/magnetite diameter ratio value is approximately 14:1. Accordingly, to effectively clean coal particles having a 0.14 mm diameter, a dense media comprising magnetite particles less than 0.01 mm in diameter is required.

The use of a Diameter Ratio Partition Curve in the manner described above is useful for beneficiation of coal from refuse material with magnetite dense media While the process is particularly useful for separation of fine coal, it is applicable to any density separation for cleaning coal The present process is also useful for any separation of solid materials generally on a density separation principle.

Acceptable separation efficiencies in dense media cyclone systems depend on the economics of a given process. However, an Ep value of 0.035 or less generally indicates a separation efficiency acceptable for economical recovery of coal, while an Ep value of 0.10 or more is generally unacceptable for effective recovery of coal.

The present invention is particularly effective for coal beneficiation systems in which a low specific gravity of separation is desired. The specific gravity of separation (or separation gravity) is the specific gravity of that portion of the feed reporting fifty percent to the underflow and fifty percent to the overflow. The separation gravity is related, but not equal, to the specific gravity of the dense medium. If, for example, it is desired to operate a beneficiation process with a low separation gravity to clean a specific size coal fraction, the present process is useful for determining the magnetite particle size necessary for effective separation. Over a small change in dense media specific gravity, the coal to magnetite particle diameter ratio for effective separation can vary greatly.

In accordance with the present invention, magnetite for the dense media is selected having a small particle size. While the present process is applicable to beneficiation of coal of all sizes, the process becomes more critical at smaller coal sizes. For such coal, correspondingly smaller magnetite is required for effective beneficiation. It is contemplated that minus 0.010 mm magnetite can be used for cleaning down to small coal particle diameters. Conventional grinding of magnetite to such small particle sizes for purposes of coal beneficiation by dense media cyclone separation processes is prohibitively expensive. Grinding costs rise exponentially as magnetite particle size decreases.

Magnetite of the present invention can be produced by the oxidative pyrohydrolysis of iron (ferrous) chloride according to the following reaction:

$$3\ FeCl_2 + 3\ H_2O + \tfrac{1}{2}O_2 \longrightarrow \underset{\text{magnetite}}{Fe_3O_4} + 6HCl \quad [10]$$

Production of fine magnetite in this manner avoids high costs of grinding larger size magnetite. An iron chloride solution is sprayed into a reaction chamber or roaster at elevated temperatures and oxygen is supplied for the reaction to produce magnetite. Such magnetite has a particle diameter less than about 0.010 mm, and substantially all of such magnetite has a particle diameter less than about 0.005 mm. "Substantially", as used above, means at least about ninety percent and more preferably about ninety-five percent.

A suitable source of iron (ferrous) chloride solution can be obtained by dissolving scrap ferrous metal with hydrochloric acid. The hydrochloric acid can be recovered from the pyrohydrolysis reaction and can be recycled to dissolve additional scrap. Spent steel making liquors are also a convenient source of iron (ferrous) chloride. Additionally, iron (ferrous) chloride can be recovered from the dissolution of ilmenite with hydrochloric acid. It should be recognized, however, that any of various solutions containing iron (ferrous) chloride can be used in this invention.

If the oxygen content in the pyrohydrolysis reaction is not controlled, the product mixture contains largely hematite particles with some magnetite, according to the following reaction:

[11]

However, by subjecting the mixture to reducing conditions, the iron oxide particles can be converted to primarily magnetite. For example, the product mixture can be heated in a carbon monoxide or a hydrogen atmosphere to reduce hematite to magnetite at relatively low temperatures of between about 300° C and about 400° C. An acceptable magnetite content in such a mixture depends upon the economics of a system. However, for example, it is contemplated that such a mixture have at least about 85% magnetite and more preferably at least about 95% magnetite.

Initially, magnetite particles formed by this process may be fused together into aggregates. Such fused particles are broken apart into separate particles as they are initially run through a separation circuit.

Production of magnetite by these gas phase pyrohydrolysis reactions produces substantially rounded magnetite particles because the temperature of formation of the particles is close to the fusion temperature of magnetite or hematite. Rounded magnetite particles are more efficient for dense media separation because they create a lower effective dense media viscosity for a given particle size and concentration than does angular magnetite produced by, for example, grinding. A lower viscosity is more efficient because the cleaned coal and refuse material move more easily through the heavy medium. Another benefit of lowered viscosity is that the medium is less costly to pump. Rounded magnetic particles are also more easily washed free from coal than are angular particles because coal particles themselves have flat angular surfaces Rounded particles are also much less abrasive to the internal components of the system, such as pumps, cyclone, and magnetic separators.

It is also contemplated that more effective separation between coal and refuse material can be achieved by treating the magnetite particles in the heavy medium suspension with a surfactant to decrease the effective viscosity of the heavy medium. Surfactants should be added to the dense media in the dense media sump prior to introduction into the cyclone. It is believed that both coal and refuse material particles move more freely in the suspension in the presence of a surfactant and are thus more likely to report to the overflow and underflow, respectively.

The concept of buoyancy discussed above is necessary to achieve separation between particulate solids and refuse material. Particulate solids must approach the buoyancy they would have if they were immersed in a true liquid of the same specific gravity as the dense media to be correctly beneficiated, and refuse material must have a negative buoyancy with respect to the media to correctly report to the underflow. Positive or negative buoyancy, however, only indicates the direction of particle velocity. For a given system, dense media separation methods also have a time limitation in that a given particle has a limited residence time. Therefore, the forces acting upon the given particle must cause it to travel far enough in the medium to be correctly beneficiated during the residence time.

Poor separation efficiencies are often encountered due to a lack of understanding of factors involved in dense media separation processes. Another aspect of the present invention includes a method for predicting the separation efficiency of a given system or proposed system for the purpose of achieving improved separation efficiencies. While this method is discussed in terms of a magnetite dense media process, it should be recognized that other types of media can be used equally well. For example, other types of dense media, such as suspensions of sand, barites, or ferrosilicon, can be used. The method is also applicable to true heavy liquids, such as solutions of halogenated hydrocarbons or aqueous salt solutions.

The present method uses, as a measure of efficiency of separation, the difference between the particle specific gravity ($SG_p$) and effective media specific gravity ($SG_{em}$) $SG_{em}$ is defined as the lowest specific gravity of separation of any size fraction treated. For practical purposes, $SG_{em}$ is slightly higher than the specific gravity of the media. This measure of efficiency, the difference between $SG_p$ and $SG_{em}$, is termed "divergence".

Figure 2:
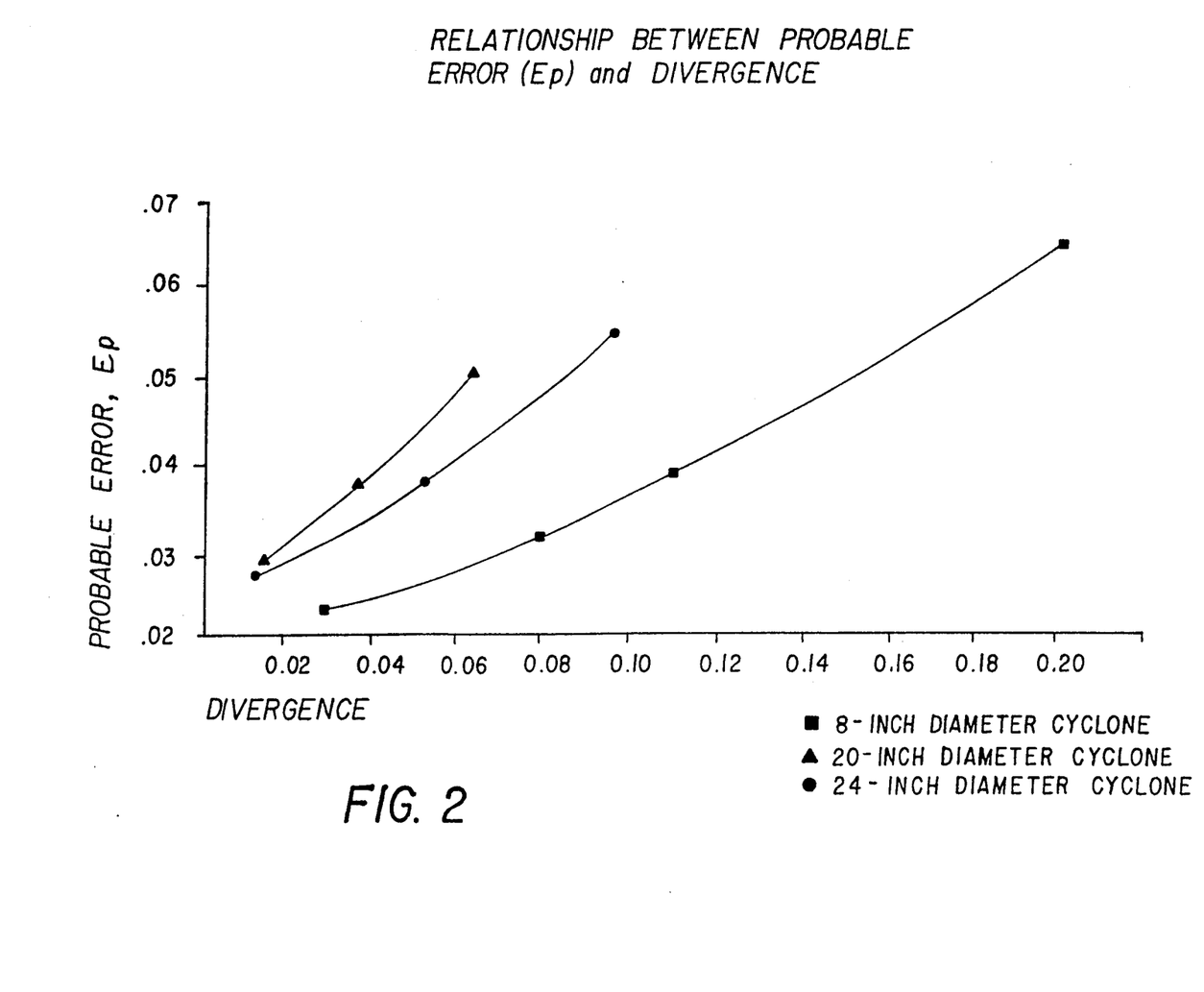
FIG. 2 illustrates the relationship between probable error (Ep) and divergence (difference between particle specific gravity and effective media specific gravity)

It has been found that a direct relationship exists between divergence values and Ep values (a widely recognized measure of efficiency). Data have been taken from two published works by Deurbrouck, and divergence values have been plotted against Ep values in FIG. 2. For the 20" and 24" cyclones, each data point represents an average of four actual data points Deurbrouck, A. W., "Washing Fine Coal In A Dense-Medium Cyclone", U.S. Dept. of Interior, U.S. Bureau of Mines, Report of Investigation 7982, 1974, six pages. Deurbrouck, A. W., "Performance Characteristics of Coal Washing Equipment-Dense-Medium Cyclones", U.S. Dept. of Interior, U.S. Bureau of Mines, Report of Investigation" 7673, 1972, 34 pages. As seen in FIG. 2, as divergence values increase, Ep values increase (less efficient separation). Therefore, by minimizing divergence values, efficiency of separation is increased. Data from the Deurbrouck works, much of which is used in the following discussion are shown in Tables 1, 2, and 3.

TABLE 1

| 8-INCH DIAMETER DENSE MEDIA CYCLONE WASHING FINE SIZE COAL[1/] | | | | | |
|---|---|---|---|---|---|
| Size Fraction inches or mesh | Geometric Mean Size mm | Specific Gravity of Separation | Divergence; Separation Gravity Minus Effective Media Gravity | Minimum Particle Velocity[2/] cm/sec | Probable Error |
| 6 by 14 | 2.18 | 1.33 | 0.00 | — | 0.024 |
| 14 by 28 | 0.841 | 1.36 | 0.03 | 40.5 | 0.024 |
| 28 by 48 | 0.420 | 1.41 | 0.08 | 36.9 | 0.034 |

TABLE 1-continued

8-INCH DIAMETER DENSE MEDIA CYCLONE WASHING FINE SIZE COAL[1]

| Size Fraction inches or mesh | Geometric Mean Size mm | Specific Gravity of Separation | Divergence; Separation Gravity Minus Effective Media Gravity | Minimum Particle Velocity[2] cm/sec | Probable Error |
|---|---|---|---|---|---|
| 48 by 65 | 0.250 | 1.44 | 0.11 | 25.6 | 0.038 |
| 65 by 100 | 0.177 | 1.53 | 0.20 | 26.4 | 0.064 |
| 100 by 200 | 0.105 | 1.57 | 0.24 | 16.6 | 0.103 |
|  |  |  | Geometric Mean | 27.85 |  |

[1] Deurbrouck, A. W., "Washing Fine-Size Coal in a Dense-Medium Cyclone," U.S. Dept. of Interior, Bureau of Mines, Report of Investigation 7982, 1974, 6 pages.
[2] Calculated by Equation 12, 13, or 14; acceleration (G) calculated by Equation B with 3.7 $R_i/R_c = 0.694$ and $R_c/r = 3$

TABLE 2

20-INCH DIAMETER DENSE MEDIA CYCLONE PLANT PRACTICE[1]

| Size Fraction inches or mesh | Geometric Mean Size mm | Specific Gravity of Separation | Divergence; Separation Gravity Minus Effective Media Gravity | Minimum Particle Velocity[2] cm/sec | Probable Error |
|---|---|---|---|---|---|
| plus ¼ | 8.22 | 1.4850 | 0.00 | — | 0.0255 |
| ¼ by 8 | 3.89 | 1.5000 | 0.0150 | 23.9 | 0.0293 |
| 8 by 14 | 1.68 | 1.5225 | 0.0375 | 24.9 | 0.0373 |
| 14 by 28 | 0.841 | 1.5475 | 0.0625 | 17.7 | 0.0508 |
|  |  |  | Geometric Mean | 21.918 |  |

[1] Deurbrouck, A. W., "Performance Characteristics of Coal-Washing Equipment: Dense-Medium Cyclone U.S. Dept. of Interior, Bureau of Mines, Report of Investigation 7673, 1972, 34 pages. Average of cyclones from four plants.
[2] Calculated by Equation 12, 13, or 14; acceleration (G) calculated by Equation B with 3.7 $R_i/R_c = 0.694$ and $R_c/r = 3$

TABLE 3

24-INCH DIAMETER DENSE MEDIA PLANT PRACTICE[1]

| Size Fraction inches or mesh | Geometric Mean Size mm | Specific Gravity of Separation | Divergence; Separation Gravity Minus Effective Media Gravity | Minimum Particle Velocity[2] cm/sec | Probable Error |
|---|---|---|---|---|---|
| plus ¼ | 10.26 | 1.4813 | 0.00 | — | 0.0217 |
| ¼ by 8 | 3.89 | 1.4950 | 0.0138 | 21.49 | 0.0270 |
| 8 by 14 | 1.68 | 1.5325 | 0.0513 | 27.23 | 0.0375 |
| 14 by 28 | 0.841 | 1.5775 | 0.0963 | 21.90 | 0.0538 |
|  |  |  | Geometric Mean | 23.400 |  |

Figure 3:
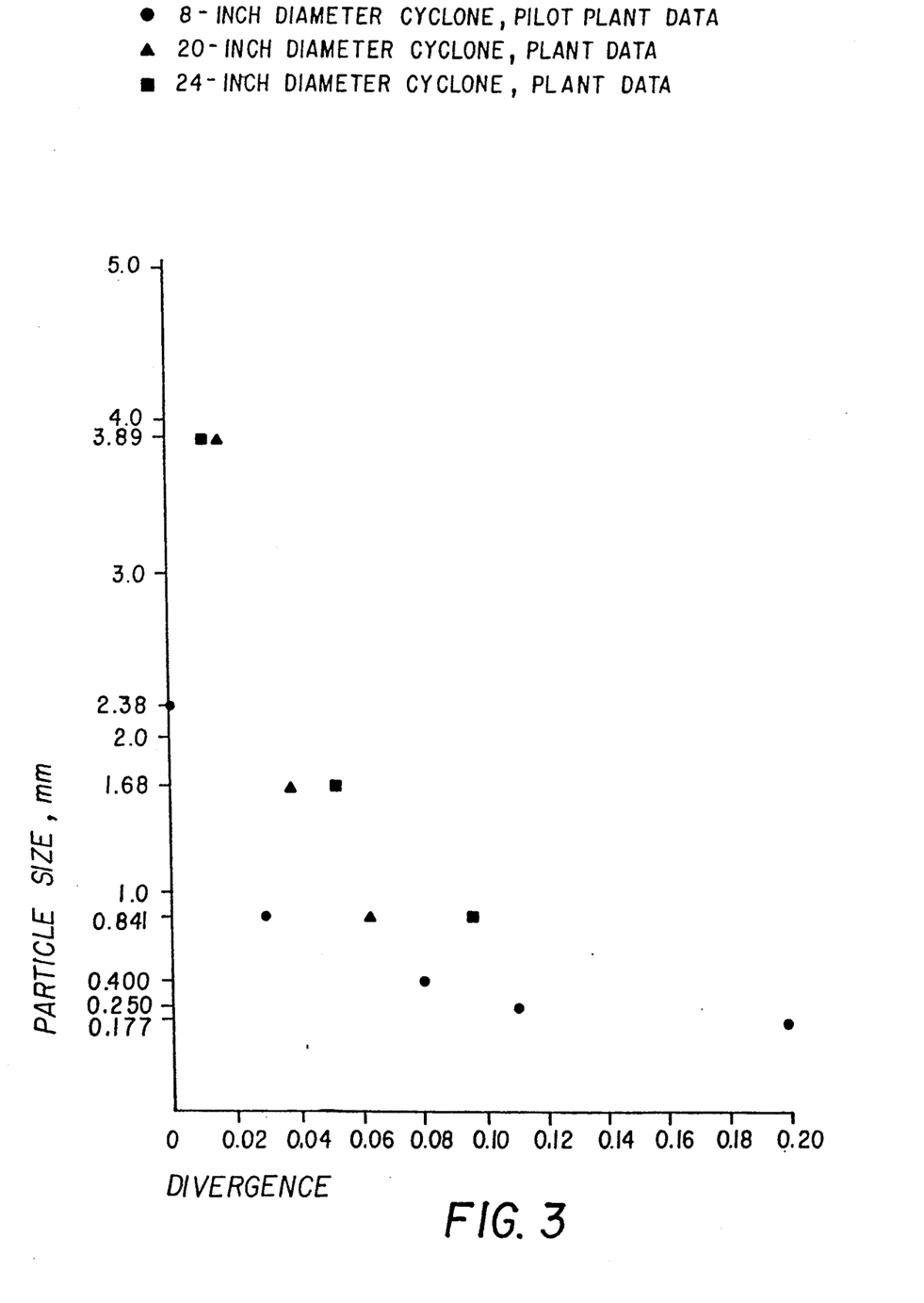
FIG. 3 illustrates the relationship between particle size and divergence of actual data from the published works of Deurbrouck.

[1] Deurbrouck, A. W., "Performance Characteristics of Coal-Washing Equipment: Dense-Medium Cyclone U.S. Dept. of Interior, Bureau of Mines, Report of Investigation 7673, 1972, 34 pages. Average of cyclones from four plants.
[2] Calculated by Equation 12, 13, or 14; acceleration (G) calculated by Equation B with 3.7 $R_i/R_c = 0.694$ and $R_c/r = 3$ The Deurbrouck data have also been plotted as divergence values versus particle size in FIG. 3. It is apparent that for smaller size particles, divergence values increase. Given the direct relationship between divergence values and Ep, it would be expected and is borne out by data that smaller particle sizes have higher divergence values since it is widely known that efficiency deteriorates at smaller size fractions.

The present method involves the use of three equations which have been derived relating divergence values to a number of factors (referred to as "divergence equations"). These factors include the following:

1. V—Velocity for a given size cyclone that a particle must achieve in the direction of buoyancy to be correctly beneficiated;
2. $D_p$—Particle Diameter;
3. G—Acceleration;
4. u—Dense Media Viscosity; and
5. $SG_{em}$—Effective Media Specific Gravity Each of the three equations is applicable to a different flow regime, turbulent, transitional, or laminar, which depends upon particle Reynolds Number. These three equations are shown immediately below. The derivation of the equations is shown before the Experimental Section.

[12] TURBULENT
$$\log \text{Div} = 2 \log V - 1 \log D_p - 1 \log G + 0.0 \log u + 1.0 \log SG_{fd} + \log 0.33$$
Re > 500

[13] TRANSITIONAL
$$\log \text{Div} = 1.4 \log V - 1.6 \log D_p - 1 \log G + 0.6 \log u + 0.4 \log SG_{fd} + \log 13.875$$
Re < 500
Re > 2

[14] LAMINAR
$$\log \text{Div} = 1.0 \log V - 2.0 \log D_p - 1 \log G + 1.0 \log u + 0.0 \log SG_{fd} + \log 18.0$$

-continued

Re < 2 where:
Div = Divergence
V = Minimum Partial Velocity to be Beneficiated
$D_p$ = Particle Diameter
G = Acceleration
u = Viscosity
$SG_{fd}$ = Fluid Specific Gravity For any given cyclone/coal system, the Particle Diameter, Viscosity, and Fluid Specific Gravity terms are constant. The Velocity (V) and Acceleration (G) terms vary as a particle moves within a cyclone. Since the particles accelerate, particle velocities change. Moreover, the G term varies as particles are at different radii. It is contemplated that the divergence equations can be used to determine divergence values by accounting for this variability. However, such mathematical precision is not required for effective use of the divergence equations. Instead, the present method involves using the concepts of apparent distance and apparent velocity to predict separation efficiency. As discussed below in more detail, apparent velocity is calculated from apparent distance which is calculated on the basis of actual data using an arbitrarily selected radius of interest. Accordingly, when apparent velocity is used to calculate a divergence value from equations 12, 13, and 14, the acceleration term, G, for that divergence value must be calculated at the same radius of interest.

The present method involves assuming that apparent velocity is a constant velocity throughout the entire residence time in the cyclone. Apparent velocity is a function of residence time and apparent distance travelled by a particle. Of the terms residence time and apparent distance, residence time can be directly calculated from the cyclone geometry and the media flow. The apparent distance, however, cannot be directly calculated because the flow dynamics and actual paths that particles travel within a cyclone cannot be accurately determined. It is noted that the apparent distance a particle must travel to be separated is the same for particles of any size and that the apparent distance is a function of the diameter of the cyclone.

To overcome the limitation of not being able to directly determine either apparent distance or apparent velocity, the present method includes determining an apparent distance based upon known data, such as that reported by Deurbrouck. The apparent distance is then used to calculate apparent velocity for use in the divergence equations. The acceleration term in the divergence equations must then be determined at a radius of interest corresponding to the selected radius of interest used in conjunction with the known data to provide the basis for determining apparent distances, as described below. In this manner, divergence values for separation systems can be determined. These predicted divergence values can be analyzed to determine whether the efficiency of a proposed system is acceptable.

Apparent distances are determined from the Deurbrouck data in the following manner. Initially, the assumption is made that the distance travelled by a particle in a cyclone is a function of cyclone diameter. Then, from the Deurbrouck data, divergence and fluid specific gravity are known and viscosity is assumed to be 1 centipoise, for each particle fraction. Acceleration varies with radius, but for present purposes is determined at an arbitrarily selected radius of interest of ⅓ the cyclone radius. With this information, the divergence equations are solved for V, and average values for V are calculated for the 8", 20", and 24" cyclones. These values are actual velocities of particles at one-third the radius of the cyclones. These values are also termed apparent velocities and are assumed to represent a constant velocity a particle must travel to be correctly beneficiated.

Figure 4:
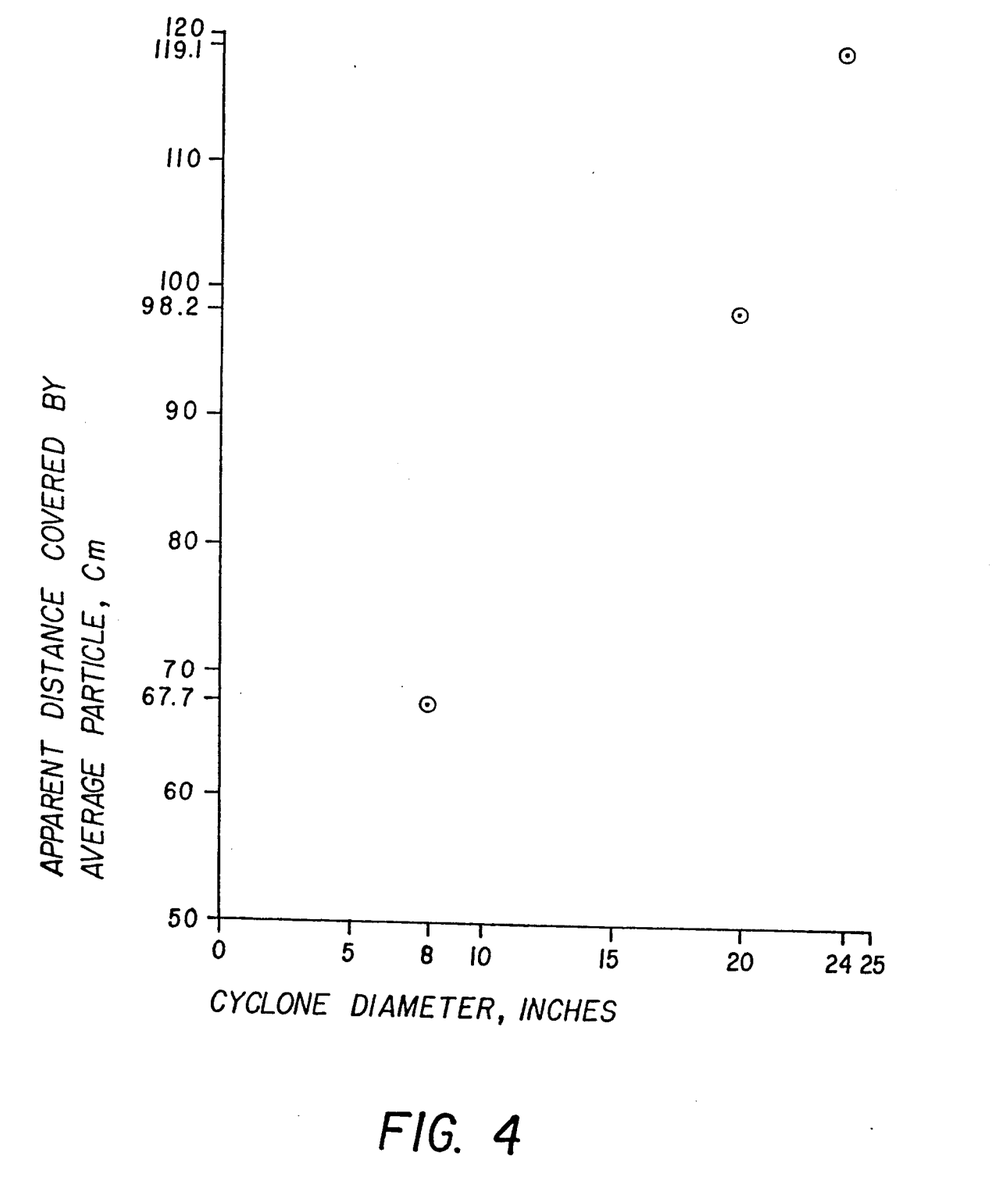
FIG. 4 illustrates the relationship between cyclone diameter and apparent distance (as defined in the specification) as determined by the data in the published works of Deurbrouck.

The apparent distance that particles travel in each of the three cyclones is then calculated by multiplying V by the residence time. The apparent distances calculated in this manner are then plotted against cyclone diameter as shown in FIG. 4. The three data points on this graph form an approximately straight line. This relationship suggests that the starting assumption was correct, and that a linear relationship exists between cyclone diameter and the apparent distance particles, regardless of size, must travel to be separated. By conducting a linear regression of the data points in FIG. 4, the following equation for determining apparent distance from cyclone diameter was calculated.

$$y = 3.05x + 42.07 \qquad [15]$$

where
y = parent distance, centimeters
x = cyclone diameter, inches

According to the present method, the efficiency of separation of a dense media cyclone for each particle size fraction can be predicted in the following manner. The residence time of a particle is calculated by dividing cyclone volume by flowrate. The apparent distance a particle must travel to be correctly beneficiated is calculated by applying the cyclone diameter to Equation 15. A value for apparent velocity is then determined by dividing the apparent distance by the residence time. G is determined at a radius of interest of ⅓. The appropriate equation, depending on Reynolds number, of Equations 12, 13, and 14 is then solved using the value for V and other known values. A value for the logarithm of the divergence value applicable to the cyclone for a given particle size and its operating conditions is then obtained.

The divergence value thus obtained can be used in a comparative analysis with divergence values applicable to cyclones having different geometry or operating conditions.

The effect of proposed changes in a separation system on efficiency of the system can be determined by the above method. Any changes in cyclone geometry and operating parameters in a separation system for improved efficiency will normally be selected on the basis of efficiency improvement per cost. Various separation systems having different cyclone geometry and operating parameters have been analyzed for predicted efficiency as measured by divergence values by the present method. The results of these analyses are described in the Experimental Section. By examining the amount of efficiency improvement from each of the changes analyzed and relative cost, it has been determined that certain changes for improving efficiency are more cost effective.

Increasing residence time by using longer cyclones or decreased cone angles has been found to be a cost effective manner for improving efficiency of separation. As seen in Example 2, substantial decreases in divergence values are achieved by increased residence time. The cost associated with this change is simply the capital cost for buying longer cyclones. This cost is minimal in terms of efficiency improvement per ton of coal. It should be noted that residence time can also be increased by using larger diameter cyclones However, any benefits from this method of increasing residence time are virtually completely offset by lower efficiency from decreased acceleration.

Another cost effective change in a separation system is to increase acceleration, without at the same time decreasing residence time. While acceleration can be increased by smaller cyclone diameters, residence time is reduced by such a change. Acceleration, however, can be increased without decreasing residence time by some combination of decreasing the inlet diameter and increasing the inlet velocity, while keeping flowrate constant. The additional cost of such changes includes costs of equipment modification and increased pumping costs to achieve higher inlet pressures. The improvements in divergence values from smaller inlet diameter at constant flowrate are shown in Example 4.

Reducing dense media viscosity is another cost effective method for improving separation efficiency. The effect of reducing the media viscosity on divergence values is illustrated in Example 3. As discussed above, viscosity reduction can be achieved by addition of a surfactant, such as Lomar D, produced by Diamond Shamrock. In this manner, magnetite particles move more freely with respect to each other. The use of rounded magnetite particles also reduces viscosity, as discussed above. Viscosity reduction can also be achieved by heating the dense media. For example, by raising the temperature of the media in a heated circuit from 68° F. to 140° F. reduces the viscosity of water from about 1 to about 0.47 centipoise. Moreover, the use of a heated circuit has other benefits, such as reduced drying time of filtered coal. The cost of achieving viscosity reductions by these methods is acceptable in view of the improvements in efficiencies. These methods of viscosity reduction can be used alone or in combination.

Particle size also has a strong effect on separation efficiences. As seen in all of the Examples, much lower divergence values are achieved for larger particle sizes. Accordingly, coal should be ground only to as small a size as is necessary for acceptable liberation. Moreover, grinding methods which generate the least amount of extreme fines should be used, such as rod rather than ball mills.

The general principles discussed above and equations 12, 13, and 14 relating to the use of cyclones for dense media separation (separation of solids based on different specific gravities) are also applicable to the use of cyclones as thickeners (separation of solids from liquid) and classifiers (separation of solids based on size). These principles and equations are also useful for other mineral processing systems which use centrifugal force, such as spirals and hydrocyclones. These principles and equations are also applicable to mineral processing systems which do not use centrifugal force for processing. Such systems include the use of vertical currents, e.g., jigs, the use of streaming currents, e.g., tables, and the use of launders. These principles can be used to predict performance effectiveness of such systems and to select operational parameters for improving performance.

Equations 12, 13, and 14 can be used directly for such other systems. However, instead of using Deurbrouck's data, similar data for the appropriate system would be used to determine apparent distance and apparent velocity. In the case of systems not using centrifugal force, acceleration would simply be gravitational acceleration.

After the coal is separated from refuse material in the dense media cyclone, the overflow portion containing clean coal is separated from the magnetite particles by magnetic separation. Coal particles having a diameter less than about 0.6 mm are typically separated from magnetite particles using magnetic separators. The underflow portion containing refuse is typically fed to a separate magnetite recovery circuit where the dense media is separated, for example, by magnetic separators and recycled.

The reductions in ash forming material by the present invention are highly advantageous and economical for coal combustion processes. For example, fouling and slagging of furnaces caused by ash is decreased with a decrease in ash forming materials in the fuel. Additionally, ash removal costs are reduced when the total ash burden is reduced. Costs are also associated with the transportation of ash forming material to a utility and movement of ash forming material and ash through the combustion process. Such costs are reduced by use and combustion of clean coal.

A clean coal from the present process is particularly advantageous for mixing with various additives and forming agglomerations prior to combustion. Such coal is suited to agglomeration because of its fine size. As used herein, "agglomeration" refers to methods for forming fine particles of coal into larger size units, such as pelletizing, compaction, or agitation. Advantages of agglomeration include improved handling of coal material, particularly during the transportation of fuel products. Agglomerations are particularly advantageous for coal-fired utilities which use pulverized coal (PC) boilers in which coal material is pulverized before combustion to a particle size less than about 0.075 mm. Energy savings in this pulverizing process are made by using agglomerations of clean coal from the process because agglomerated coal is more easily pulverized than solid coal pieces and a large percentage of the coal particles in the pellets already meet the size requirements for the crushing process.

There are additional advantages to using clean coal from the present process when additives are incorporated with the coal material. Such additives can include materials for air pollution reduction, such as alkaline sorbents for sulfur capture, sulfation promoters, catalysts for intermediate reactions in air pollution reduction processes, or anti-slagging agents. While such additives can form ash upon combustion, the overall ash burden is sufficiently reduced by the present process that ash formed from additives is acceptable. Additionally, because of the fine size of the coal particles, additives are particularly effective due to ease of dispersion of additives and intimate mixture with the fine coal particles.

DERIVATION OF DIVERGENCE EQUATIONS

The force acting on a coal particle in a cyclone system in the direction of the interior of the cyclone is termed the "buoyant force" and is provided by Equation A.

$$F_b = Vol_p(SG_p - SG_{fd})G \quad [A]$$

wherein,
$F_b$ = buoyant force
$Vol_p$ = particle volume
$SG_p$ = particle specific gravity
$SG_{fd}$ = specific gravity of fluid displaced
$G$ = G acceleration The G acceleration is a radial acceleration which is caused by the circular motion of the coal/refuse/media stream inside the cyclone. This acceleration is a function of tangential velocity of the stream. As can be seen from Equation A, to increase the buoyant force on a given particle in a given dense media, the G acceleration must be increased.

Bradley, D., *The Hydrocyclone*, Pergamon Press Ltd., London, 1965, discusses cyclones and provides two equations which, solved simultaneously, give the following equation for G acceleration.

$$G = V_{tang}/r = \frac{\left(\frac{3.7 R_i}{R_c}\right)^2 V_i^2}{R_c} \left(\frac{R_c}{r}\right)^{2n+1} \quad [B]$$

wherein,
$R_i$ = radius of inlet, ft
$R_c$ = radius of cyclone, ft
$V_i$ = velocity of feed in inlet, ft/sec
$r$ = radius of interest, ft
$V_{tang}$ = tangential velocity of stream inside cyclone, ft/sec For purposes of the present discussion, the radius of interest, i.e., the radius within the cyclone at which acceleration is determined has been selected as $\frac{1}{3}$. As mentioned previously, selection of this value for r is not critical to the present invention and other values work equally well. The term n is an exponent, the value of which depends on cyclone geometry. A value of 0.8 is typical and will be used in this derivation.

In opposition to the buoyant force, is a resistance force. The resistance force is a function of many variables and depends, in part, upon the flow regime of particles inside the cyclone. As is known, particles can have turbulent, transitional, or laminar flow regimes. The particular flow regime for a particle depends upon the properties of fluid in which the particle is travelling, viscosity and specific gravity, as well as on the particle's velocity and diameter. The Reynolds number of a particle is the criterion which determines flow regime. For Reynolds numbers less than 2, particles will travel in laminar flow. For Reynolds numbers between about 2 and about 500, flow will be in a transitional phase. For Reynolds numbers greater than about 500, turbulent flow occurs. The formula for Reynolds number is provided in Equation C.

$$Re = \frac{D_p V_p SG_{fd}}{u} \quad [C]$$

wherein, $Re$ = Reynolds number
$D_p$ = particle diameter
$V_p$ = particle velocity
$SG_{fd}$ = specific gravity of fluid displaced
$u$ = viscosity of fluid displaced The coefficient of resistance of a particle is a measure of resistance experienced by a particle as it travels through a fluid. The formula for coefficient of resistance is provided in Equation D.

$$Q = \frac{4 D_p (SG_p - SG_{fd}) G}{3 V_p^2 (SG_{fd})} \quad [D]$$

where
$Q$ = coefficient of resistance
$D_p$ = particle diameter
$SG_p$ = particle specific gravity
$SG_{fd}$ = specific gravity of fluid displaced
$G$ = G acceleration
$V_p$ = particle velocity The relationship between coefficient of resistance and Reynolds number can be described by three equations, one for each flow regime.

$$Turbulent(Re > 500) \; \log Q = \log 0.44 \quad [E]$$

$$Transitional(500 > Re > 2) \; \log Q = \log 18.5 - 3/5 \log Re \quad [F]$$

$$Laminar(Re > 2) \; \log Q = \log 24 - \log Re \quad [G]$$

The particle velocity can be determined in the following manner. Equations C and D are solved for the velocity term and then set equal. The following relationship is derived from this procedure.

$$\log Q = \log \frac{4 D_p (SG_p - SG_{fd}) G}{3 SG_{fd}} + 2 \log \frac{D_p SG_{fd}}{u} - 2 \log Re \quad [H]$$

The log Q term in Equations E, F, and G can be substituted into Equation H and the resulting Reynolds number may then be solved for particle velocity in terms which are generally known. These equations for each of the three flow regimes are provided in Equations I, J, and K.

$$(Re > 500) \; 2 \log V_p = \log \frac{4 D_p (SG_p - SG_{fd}) G}{3 SG_{fd}} - \log 0.44 \quad [I]$$

$$500 > Re > 2 \; 1.4 \log V_p = \log \frac{4 D_p (SG_p - SG_{fd}) G}{3 SG_{fd}} + \quad [J]$$

$$0.6 \log \frac{D_p SG_{fd}}{u} - \log 18.5$$

$$Re < 2 \; \log V_p = \log \frac{4 D_p (SG_p - SG_{fd}) G}{3 SG_{fd}} + \quad [K]$$

$$\log \frac{D_p SG_{fd}}{u} - \log 24$$

Equations I, J, and K can be algebraically manipulated to the form of Equations 12, 13, and 14.

EXPERIMENTAL

Example 1

Observed divergence values for different size fractions of coal from Deurbrouck's work with an 8 inch cyclone are compared with divergence values predicted by the present method using the actual test parameters of Deurbrouck's work. The actual conditions of Deurbrouck's test are shown in Table 1-A.

TABLE 1-A

| Parameter | Value (Actual Conditions) | Value (New Conditions) |
|---|---|---|
| Cyclone Diameter | 8 inches | 8 inches |
| Inlet Diameter | 1.5 inches | 0.75 inches |
| Cyclone Length | 8 inches | 32 inches |
| Cone Angle | 12 degrees | 12 degrees |
| Flowrate | 110 gpm | 141.6 gpm |
| Viscosity | 1 centipoise (assumed) | 0.4688 centipoise |
| Effective Media Gravity | 1.33 | 1.33 |

Based upon the actual conditions in Table 1-A, predicted divergence values were calculated according to the present method. These predicted values are compared with observed divergence values for each size fraction considered by Deurbrouck. This comparison is shown in Table 1-B.

TABLE 1-B

| Size Fraction | Observed Divergence | Predicted Divergence (Actual Conditions) | Predicted Divergence (New Conditions) |
|---|---|---|---|
| 0.814 mm | 0.03 | 0.017 | 0.001 |
| 0.420 mm | 0.08 | 0.053 | 0.002 |
| 0.250 mm | 0.11 | 0.121 | 0.006 |
| 0.177 mm | 0.20 | 0.210 | 0.010 |
| 0.105 mm | 0.24 | 0.483 | 0.022 |
| 0.074 mm | — | 0.846 | 0.039 |
| 0.037 mm | — | 2.565 | 0.119 |

A new set of test conditions, varying four factors from Deurbrouck's 8 inch cyclone data, were selected for improved separation. These new conditions were analyzed according to the present invention to determine predicted divergence values to illustrate the potential for improved efficiency of separation. The values for the new conditions are shown in Table 1-A and the predicted divergence values under the new conditions are shown in Table 1-B. The improvement in predicted divergence values from the modifications in the four changed conditions is substantial. Acceptable cleaning efficiencies, represented by a divergence value of 0.119, are obtained for particles even as small as 37 microns (400-mesh).

Example 2

For Examples 2-8, a series of simulated separation runs were conducted using Equations 12, 13, and 14, to examine the effect on separation efficiency, as indicated divergence values, of variations in different parameters.

In Example 2, four simulation runs were conducted with the residence time being varied by up to a factor of 6. The results of this comparison and the effects on divergence values are shown in Table 2-A. It should be noted that this simulation illustrates an increase in residence time by either an increase in the length of the cyclone or by a decrease in the cone angle. If the residence time increase had been achieved by increased cyclone diameter, the acceleration value would have been decreased at higher cyclone diameters.

TABLE 2-A

| | Run | | | |
|---|---|---|---|---|
| | 1 | 2 | 3 | 4 |
| Cyclone Diameter, inches | 8 | 8 | 8 | 8 |
| Inlet Velocity, ft/sec | 68.4 | 68.4 | 68.4 | 68.4 |
| Alpha, 3.7 $D_{inlet}/D_{cyclone}$ | 0.60 | 0.60 | 0.60 | 0.60 |
| Flowrate, GPM | 281.8 | 282.0 | 282.0 | 282.0 |
| Acceleration, g's | 2735 | 2735 | 2735 | 2735 |
| Residence Time | 0.939 | 1.409 | 2.817 | 5.635 |
| Residence Time Factor, × std cyc. | 1 | 1.5 | 3 | 6 |
| Minimum Vel. for Separation, cm/sec | 70.8 | 47.2 | 23.6 | 11.8 |
| Viscosity, Centipoise | 1.0 | 1.0 | 1.0 | 1.0 |
| Specific Gravity of Fluid Displaced | 1.5 | 1.5 | 1.5 | 1.5 |
| Divergence at | | | | |
| 0.074 mm (200-mesh) | 0.383 | 0.217 | 0.082 | 0.031 |
| 0.037 mm (400-mesh) | 1.2 | 0.659 | 0.250 | 0.095 |
| 0.0185 mm | 3.5 | 2.0 | 0.757 | 0.287 |

Example 3

The effect of viscosity on efficiency of separation, as measured by divergence values, was examined in simulation runs 1-4. All other factors were held constant with viscosity being varied from 1.0 to 0.3565 centipoise. The media temperatures represented by the simulated changes in viscosity are approximately 20° C. 40° C., 60° C., and 80° C. The results of these test runs and effects on diverge are shown in Table 3-A.

TABLE 3-A

| | Run | | | |
|---|---|---|---|---|
| | 1 | 2 | 3 | 4 |
| Cyclone Diameter, inches | 8 | 8 | 8 | 8 |
| Inlet Velocity, ft/sec | 68.4 | 68.4 | 68.4 | 68.4 |
| Alpha, 3.7 $D_{inlet}/D_{cyclone}$ | 0.60 | 0.60 | 0.60 | 0.60 |
| Flowrate, GPM | 281.8 | 282.0 | 282.0 | 282.0 |
| Acceleration, g's | 2735 | 2735 | 2735 | 2735 |
| Residence Time | 0.939 | 0.939 | 0.939 | 0.939 |
| Residence Time Factor, × std cyc. | 1 | 1 | 1 | 1 |
| Minimum Vel. for Separation, cm/sec | 70.8 | 70.8 | 70.8 | 70.8 |
| Viscosity, Centipoise | 1.0 | 0.6560 | 0.4688 | 0.3565 |
| Specific Gravity of Fluid Displaced | 1.5 | 1.5 | 1.5 | 1.5 |
| Divergence at | | | | |
| 0.074 mm (200-mesh) | 0.383 | 0.298 | 0.243 | 0.206 |
| 0.037 mm (400-mesh) | 1.2 | 0.902 | 0.737 | 0.626 |
| 0.0185 mm | 3.5 | 2.7 | 2.2 | 1.9 |

Example 4

The effect of varying the term alpha on particle separation efficiency, as measured by divergence values, was examined in simulation test runs 1-4. The alpha value is equal to 3.7 ($D_{inlet}/D_{cyclone}$). Since cyclone diameter was held constant, only the inlet diameter was varied in each of the runs. The effect of making the inlet diameter smaller, given a constant flowrate, is to increase inlet velocity and, therefore, acceleration. As can be seen from the results in Table 4-A, divergence values were significantly decreased by decreases in the value of alpha.

TABLE 4-A

|  | Run 1 | Run 2 | Run 3 | Run 4 |
|---|---|---|---|---|
| Cyclone Diameter, inches | 8 | 8 | 8 | 8 |
| Inlet Velocity, ft/sec | 20 | 30.4 | 54.1 | 121.7 |
| Alpha, 3.7 $D_{inlet}/D_{cyclone}$ | 0.74 | 0.60 | 0.45 | 0.30 |
| Flowrate, GPM | 125.3 | 125.3 | 125.3 | 125.3 |
| Acceleration, g's | 356 | 541 | 961 | 2163 |
| Residence Time | 2.11 | 2.11 | 2.11 | 2.11 |
| Residence Time Factor, × std cyc. | 1 | 1 | 1 | 1 |
| Minimum Vel. for Separation, cm/sec | 31.5 | 31.5 | 31.5 | 31.5 |
| Viscosity, Centipoise | 1.0 | 1.0 | 1.0 | 1.0 |
| Specific Gravity of Fluid Displaced | 1.5 | 1.5 | 1.5 | 1.5 |
| Divergence at |  |  |  |  |
| 0.074 mm (200-mesh) | 0.948 | 0.623 | 0.351 | 0.156 |
| 0.037 mm (400-mesh) | 2.9 | 1.9 | 1.1 | 0.472 |
| 0.0185 mm | 8.7 | 5.7 | 3.2 | 1.4 |

Example 5

The effect of increases inlet velocity at constant inlet diameter on particle separation efficiency, as measured by divergence values, was examined with the results shown in Tables 5-A, 5-B, 5-C, and 5-D. As can be seen from the following results, the increased acceleration has a beneficial effect on divergence values.

TABLE 5-A

|  | Run 1 | Run 2 | Run 3 |
|---|---|---|---|
| Cyclone Diameter, inches | 8 | 8 | 8 |
| Inlet Velocity, ft/sec | 20 | 45 | 70 |
| Alpha, 3.7 $D_{inlet}/D_{cyclone}$ | 0.74 | 0.74 | 0.74 |
| Flowrate, GPM | 125.3 | 282.0 | 438.7 |
| Acceleration, g's | 356 | 1800 | 4357 |
| Residence Time | 2.11 | 0.939 | 0.603 |
| Residence Time Factor, × std cyc. | 1 | 1 | 1 |
| Minimum Vel. for Separation, cm/sec | 31.5 | 70.9 | 110.2 |
| Viscosity, Centipoise | 1.0 | 1.0 | 1.0 |
| Specific Gravity of Fluid Displaced | 1.5 | 1.5 | 1.5 |
| Divergence at |  |  |  |
| 0.074 mm (200-mesh) | 0.948 | 0.583 | 0.447 |
| 0.037 mm (400-mesh) | 2.9 | 1.8 | 1.4 |
| 0.0185 mm | 8.7 | 5.4 | 4.1 |

TABLE 5-B

|  | Run 1 | Run 2 | Run 3 |
|---|---|---|---|
| Cyclone Diameter, inches | 8 | 8 | 8 |
| Inlet Velocity, ft/sec | 30.4 | 68.4 | 106.5 |
| Alpha, 3.7 $D_{inlet}/D_{cyclone}$ | 0.60 | 0.60 | 0.60 |
| Flowrate, GPM | 125.3 | 282.0 | 438.7 |
| Acceleration, g's | 541 | 2739 | 6678 |
| Residence Time | 2.11 | 0.939 | 0.603 |
| Residence Time Factor, × std cyc. | 1 | 1 | 1 |
| Minimum Vel. for Separation, cm/sec | 31.5 | 70.9 | 110.2 |
| Viscosity, Centipoise | 1.0 | 1.0 | 1.0 |
| Specific Gravity of Fluid Displaced | 1.5 | 1.5 | 1.5 |
| Divergence at |  |  |  |
| 0.074 mm (200-mesh) | 0.623 | 0.383 | 0.294 |
| 0.037 mm (400-mesh) | 1.9 | 1.2 | 0.891 |
| 0.0185 mm | 5.7 | 3.5 | 2.7 |

TABLE 5-C

|  | Run 1 | Run 2 | Run 3 |
|---|---|---|---|
| Cyclone Diameter, inches | 8 | 8 | 8 |
| Inlet Velocity, ft/sec | 54.1 | 121.7 | 189.3 |
| Alpha, 3.7 $D_{inlet}/D_{cyclone}$ | 0.45 | 0.45 | 0.45 |
| Flowrate, GPM | 125.3 | 282.0 | 438.7 |
| Acceleration, g's | 961 | 4869 | 11,783 |
| Residence Time | 2.11 | 0.939 | 0.603 |
| Residence Time Factor, × std cyc. | 1 | 1 | 1 |
| Minimum Vel. for Separation, cm/sec | 31.5 | 70.9 | 110.2 |
| Viscosity, Centipoise | 1.0 | 1.0 | 1.0 |
| Specific Gravity of Fluid Displaced | 1.5 | 1.5 | 1.5 |
| Divergence at |  |  |  |
| 0.074 mm (200-mesh) | 0.351 | 0.216 | 0.165 |
| 0.037 mm (400-mesh) | 1.1 | 0.653 | 0.501 |
| 0.0185 mm | 3.2 | 2.0 | 1.5 |

TABLE 5-D

|  | Run 1 | Run 2 | Run 3 |
|---|---|---|---|
| Cyclone Diameter, inches | 8 | 8 | 8 |
| Inlet Velocity, ft/sec | 121.7 | 273.8 | 425.9 |
| Alpha, 3.7 $D_{inlet}/D_{cyclone}$ | 0.30 | 0.30 | 0.30 |
| Flowrate, GPM | 125.3 | 282.0 | 438.7 |
| Acceleration, g's | 2163 | 10,955 | 26,511 |
| Residence Time | 2.11 | 0.939 | 0.603 |
| Residence Time Factor, × std cyc. | 1 | 1 | 1 |
| Minimum Vel. for Separation, cm/sec | 31.5 | 70.9 | 110.2 |
| Viscosity, Centipoise | 1.0 | 1.0 | 1.0 |
| Specific Gravity of Fluid Displaced | 1.5 | 1.5 | 1.5 |
| Divergence at |  |  |  |
| 0.074 mm (200-mesh) | 0.156 | 0.096 | 0.073 |
| 0.037 mm (400-mesh) | 0.472 | 0.290 | 0.223 |
| 0.0185 mm | 1.4 | 0.880 | 0.675 |

Example 6

The effect of increased flowrate, at constant inlet velocity, was examined in Table 6-A. As can be seen from the following results, in contrast to Example 5, divergence values increased as flowrate increased.

TABLE 6-A

|  | Run 1 | Run 2 | Run 3 |
|---|---|---|---|
| Cyclone Diameter, inches | 8 | 8 | 8 |
| Inlet Velocity, ft/sec | 45 | 45 | 45 |
| Alpha, 3.7 $D_{inlet}/D_{cyclone}$ | 0.493 | 0.74 | 0.923 |
| Flowrate, GPM | 125.3 | 282.0 | 438.7 |
| Acceleration, g's | 800 | 1800 | 2801 |
| Residence Time | 2.11 | 0.939 | 0.603 |
| Residence Time Factor, × std cyc. | 1 | 1 | 1 |
| Minimum Vel. for Separation, cm/sec | 31.5 | 70.9 | 110.2 |
| Viscosity, Centipoise | 1.0 | 1.0 | 1.0 |
| Specific Gravity of Fluid Displaced | 1.5 | 1.5 | 1.5 |
| Divergence at |  |  |  |
| 0.074 mm (200-mesh) | 0.421 | 0.583 | 0.696 |
| 0.037 mm (400-mesh) | 1.277 | 1.8 | 2.180 |
| 0.0185 mm | 3.872 | 5.4 | 6.4 |

Example 7

The effect of varying cyclone diameter on efficiency, as measured by divergence values, was examined in simulation runs 1-6. The results of these runs are provided below in Table 7-A. It can be seen that at smaller cyclone diameters, which have an included cone angle of 12°, there is, for all practical purposes, no effect on divergence values. For cyclones having a cone angle of 20°, some small improvements divergence values is observed at smaller cyclone diameters. The lack of substantial improvements is due to decreased residence time.

TABLE 7-A

|  | Run | | | | | |
|---|---|---|---|---|---|---|
|  | 1 | 2 | 3 | 4 | 5 | 6 |
|  | (20° cone angle) | | | (12° cone angle) | | |
| Cyclone Diameter, inches | 24 | 20 | 14 | 8 | 4 | 3 |
| Inlet Velocity, ft/sec | 68.4 | 68.4 | 68.4 | 68.4 | 68.4 | 68.4 |
| Alpha, 3.7 $D_{inlet}/D_{cyclone}$ | 0.60 | 0.60 | 0.60 | 0.60 | 0.60 | 0.60 |
| Flowrate, GPM | 2536.2 | 1761.2 | 863.0 | 281.8 | 70.4 | 39.6 |
| Acceleration, g's | 912 | 1,094 | 1,563 | 2,735 | 5,469 | 7,293 |
| Residence Time | 2.13 | 1.77 | 1.24 | 0.939 | 0.470 | 0.352 |
| Residence Time Factor, × std cyc. | 1 | 1 | 1 | 1 | 1 | 1 |
| Minimum Vel. for Separation, cm/sec | 54.2 | 58.2 | 68.3 | 70.8 | 115.6 | 145.5 |
| Viscosity, Centipoise | 1.0 | 1.0 | 1.0 | 1.0 | 1.0 | 1.0 |
| Specific Gravity of Fluid Displaced | 1.5 | 1.5 | 1.5 | 1.5 | 1.5 | 1.5 |
| Divergence at | | | | | | |
| 0.074 mm (200-mesh) | 0.791 | 0.727 | 0.638 | 0.383 | 0.381 | 0.393 |
| 0.037 mm (400-mesh) | 2.4 | 2.2 | 1.93 | 1.2 | 1.2 | 1.2 |
| 0.0185 mm | 7.3 | 6.6 | 5.9 | 3.5 | 3.5 | 3.6 |

Example 8

The effect of media specific gravity on efficiency of separation, as measured by divergence values, was examined. Little effect was observed on divergence values by variations in this factor.

TABLE 8

|  | Run | | |
|---|---|---|---|
|  | 1 | 2 | 3 |
| Cyclone Diameter, inches | 8 | 8 | 8 |
| Inlet Velocity, ft/sec | 68.4 | 68.4 | 68.4 |
| Alpha, 3.7 $D_{inlet}/D_{cyclone}$ | 0.60 | 0.60 | 0.60 |
| Flowrate, GPM | 281.8 | 282.0 | 282.0 |
| Acceleration, g's | 2735 | 2735 | 2735 |
| Residence Time | 0.939 | 0.939 | 0.939 |
| Residence Time Factor, × std cyc. | 1 | 1 | 1 |
| Minimum Vel. for Separation, cm/sec | 70.8 | 70.8 | 70.8 |
| Viscosity, Centipoise | 1.0 | 1.0 | 1.0 |
| Specific Gravity of Fluid Displaced | 1.5 | 1.4 | 1.3 |
| Divergence at | | | |
| 0.074 mm (200-mesh) | 0.383 | 0.373 | 0.362 |
| 0.037 mm (400-mesh) | 1.2 | 1.1 | 1.1 |
| 0.0185 mm | 3.5 | 3.4 | 3.3 |

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for beneficiating particulate solids suspended in a media, comprising:
  a) selecting a first divergence value;
  b) selecting particle beneficiation apparatus geometry and operating parameters;
  c) determining an apparent distance a particle must travel to be correctly beneficiated for the apparatus geometry selected in step b;
  d) calculating an apparent velocity a particle must achieve to be correctly beneficiated using said apparent distance; and
  e) calculating a second divergence value for the particle beneficiation apparatus geometry and operating parameters selected in step b using said apparent velocity;
  f) comparing said second divergence value calculated in step e with said first divergence value from step a;
  g) repeating steps b through f until said second divergence value calculated in step e is less than said first divergence value from step a;
  h) beneficiating particulate solids in a process comprising particle beneficiation apparatus geometry and operating parameters resulting in said second divergence value being less than said first divergence value in step g.

2. A method as claimed in claim 1, wherein said process comprising applying centrifugal force to said media by causing said media to travel in a circular path and wherein said step of determining an apparent distance comprises using the equation:

$$D = aM + b$$

where
D = apparent distance, centimeters
M = diameter of said circular path, inches
a = about 3
b = about 42

3. A method as claimed in claim 2, wherein said step of determining an apparent distance comprises calculating an actual particle acceleration from known data for a cyclone separation at a given fraction of the cyclone radius; and further comprising calculating a particle acceleration of said separation process at said given fraction of the radius of the circular path used to apply said centrifugal force.

4. A method as claimed in claim 3, wherein said particle acceleration of said separation process is calculated by the formula:

$$G = V_{tang}/r$$

where
G = particle acceleration $V_{tang}$ = tangential particle velocity
r = given fraction of radius 5. A method as claimed in claim 1, wherein said step of calculating an apparent velocity comprises calculating a residence time for said particulate solids and dividing said apparent distance by said residence time.

6. A method as claimed in claim 1, wherein said step of calculating a divergence value comprises determining a flow regime applicable to said particulate solids and using an equation to calculate said divergence value for said flow regime, which equation is selected from among Equations 12, 13, or 14, as described below:

Turbulent $$\log Div = 2 \log V - 1 \log D_p - 1 \log G + 0.0 \log u + 1.0 \log SG_{fd} + \log 0.33;$$

Transitional $$\log Div = 1.4 \log V - 1.6 \log D_p - 1 \log G + 0.6 \log u + 0.4 \log SG_{fd} + \log 18.0;$$

Laminar $$\log Div = 1.0 \log V - 2.0 \log D_p - 1 \log G + 1.0 \log u + 0.0 \log SG_{fd} + \log 18.0;$$

where
Div = Divergence
V = Minimum Particle Velocity to be Beneficiated
$D_p$ = Particle Diameter
G = Acceleration
u = Viscosity
$SG_{fd}$ = Fluid Specific Gravity.

7. A method for beneficiating, thickening or sizing particulate solids suspended in a media, comprising:
a) selecting a first divergence value;
b) selecting beneficiation, thickening or sizing apparatus geometry and operating parameters;
c) determining an apparent distance a particle must travel to be correctly beneficiated, thickened or sized for the apparatus geometry selected in step b;
d) calculating an apparent velocity a particle must achieve to be correctly beneficiated, thickened or sized using said apparent distance;
e) calculating a second divergence value for the beneficiation, thickening or sizing apparatus and operating parameters selected in step b using said apparent velocity;
f) comparing said second divergence value calculated in step e with said first divergence value from step a;
g) repeating steps b through f until said second divergence value calculated in step e is less than said first divergence value from step a;
h) beneficiating, thickening or sizing particulate solids in a process comprising apparatus geometry and operating parameters resulting in said second divergence value being less than said first divergence value in step g.

* * * * *